United States Patent [19]

Fisher et al.

[11] Patent Number: 5,889,373
[45] Date of Patent: Mar. 30, 1999

[54] FLUORESCENT LAMP BALLAST WITH CURRENT FEEDBACK USING A DUAL-FUNCTION MAGNETIC DEVICE

[75] Inventors: Rayette Ann Fisher, Schenectady, N.Y.; David Joseph Kachmarik, Strongsville, Ohio; William Newell Schultz, Niskayuna; Robert James Thomas, Rexford, both of N.Y.

[73] Assignee: General Electric Company, Schenectady, N.Y.

[21] Appl. No.: 774,544

[22] Filed: Dec. 30, 1996

[51] Int. Cl.⁶ ...................................... H05B 37/02
[52] U.S. Cl. .................. 315/307; 315/278; 336/178; 336/165; 323/247; 323/250
[58] Field of Search .................... 323/247, 250, 323/308, 357, 358, 331, 351, 248; 336/170, 178, 160, 165; 315/276, 307, 278, 274, 275, 291, 283

[56] References Cited

U.S. PATENT DOCUMENTS

| | | |
|---|---|---|
| 3,396,307 | 8/1968 | Campell ................................. 315/221 |
| 3,546,571 | 12/1970 | Fletcher et al. ......................... 336/178 |
| 3,703,677 | 11/1972 | Farrow ................................ 336/178 X |
| 4,613,841 | 9/1986 | Roberts ............................... 336/178 X |
| 5,349,270 | 9/1994 | Roll et al. ............................ 315/209 R |

FOREIGN PATENT DOCUMENTS 1 171 089   1/1959   France ................................... 336/165

OTHER PUBLICATIONS

"Circuits and Applications for Portable and Emergency Lighting Using Fluorescent Lamps," JH Campbell, QD Dobras, Transaction IES, Jan. 1967, pp. 43–51.

*Primary Examiner*—Arnold Kinkead
*Attorney, Agent, or Firm*—Jill M. Breedlove; Douglas E. Stoner

[57] ABSTRACT

A fluorescent lamp ballast utilizes a single a transformer for providing both tank inductance and current mode feedback to the ballast driver circuitry. The transformer has an "EE" core with inductor windings on the center legs and gate windings on one of the outer legs. The center leg is gapped to avoid magnetic core saturation and to adjust inductance to a desired value. Coupling can be adjusted further by gapping one or the other of the outer legs.

17 Claims, 3 Drawing Sheets

FLUORESCENT LAMP BALLAST WITH CURRENT FEEDBACK USING A DUAL-FUNCTION MAGNETIC DEVICE

FIELD OF THE INVENTION

The present invention relates generally to fluorescent lamp ballasts and, more particularly, to a fluorescent lamp ballast employing a single magnetic component for both tank inductance and current feedback.

BACKGROUND OF THE INVENTION

In self-resonant ballast circuits, a signal is fed back from a resonant LC tank to the drive circuitry of a pair of half-bridge switches. Two common classes of self-resonant circuits are those which feed back a sample of the tank inductor voltage and those which feed back a sample of the LC tank current. Ballasts of the voltage feedback class have the advantage of simple construction, requiring only a single magnetic component. Secondary windings are wound on the ferrite or other magnetic core used to construct the tank inductor to act as transformer windings, providing the inductor voltage to the drive circuits of the ballast switches. Disadvantageously, however, such voltage feedback circuits suffer from poor input power regulation as either the lamp resistance or line input voltage is changed.

Ballasts of the current feedback class exhibit much better input power regulation. In such current feedback circuits, a current transformer is inserted into the LC tank circuit to feed back a sample of the tank current to the ballast drive circuitry. The transformer is wound on a magnetic core separate from the core used by the tank inductor. Disadvantageously, however, since they require two magnetic components, current feedback ballasts suffer from increased circuit and layout complexity as well as added cost.

Accordingly, it is desirable to provide a fluorescent lamp ballast which achieves current feedback performance using a single magnetic component to function as both tank inductor and current feedback transformer.

SUMMARY OF THE INVENTION

A fluorescent lamp ballast comprises a single magnetic component, i.e., a transformer, for providing both tank inductance and current mode feedback to the ballast drive circuitry. The transformer comprises an "EE" core with inductor windings on the center legs and gate windings on one of the outer legs. In a preferred embodiment, the center leg is gapped to avoid magnetic core saturation and to provide a desired value of tank inductance. The flux generated in the core divides between the two outer legs of the core. In this way, coupling between the center and outer legs is significantly reduced below unity, shifting transformer operation from a voltage transformer toward a current transformer. Coupling can be adjusted further by providing a gap in one or the other of the outer legs.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
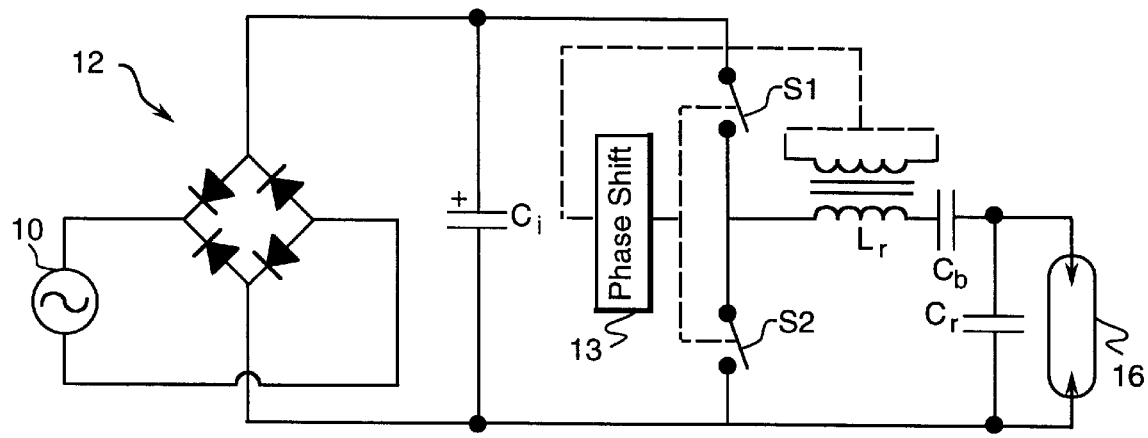
FIG. 1 schematically illustrates a simplified, conventional self-resonant ballast circuit with inductor voltage feedback.

FIG. 1 illustrates a typical self-resonant ballast with inductor voltage feedback. As illustrated, an ac voltage from an ac source 10 is rectified by a full-wave rectifier 12 such that a dc voltage is applied to the parallel connection of an input capacitor $C_i$ and a half-bridge connection of active switching devices, shown schematically as simple switches S1 and S2. A resonant circuit comprising a resonant inductor $L_r$ and a resonant capacitor $C_r$ is coupled at the output of the half-bridge. A dc blocking capacitor $C_b$ is shown as being coupled in series with the resonant inductor $L_r$. As explained hereinabove, although such voltage feedback ballast circuits are simple in construction, they exhibit poor input power regulation as either the lamp resistance or the line input voltage is changed. As shown and as is well-known, a phase shift circuit 13 is typically used to provide full inversion between the output and the input.

Figure 2:
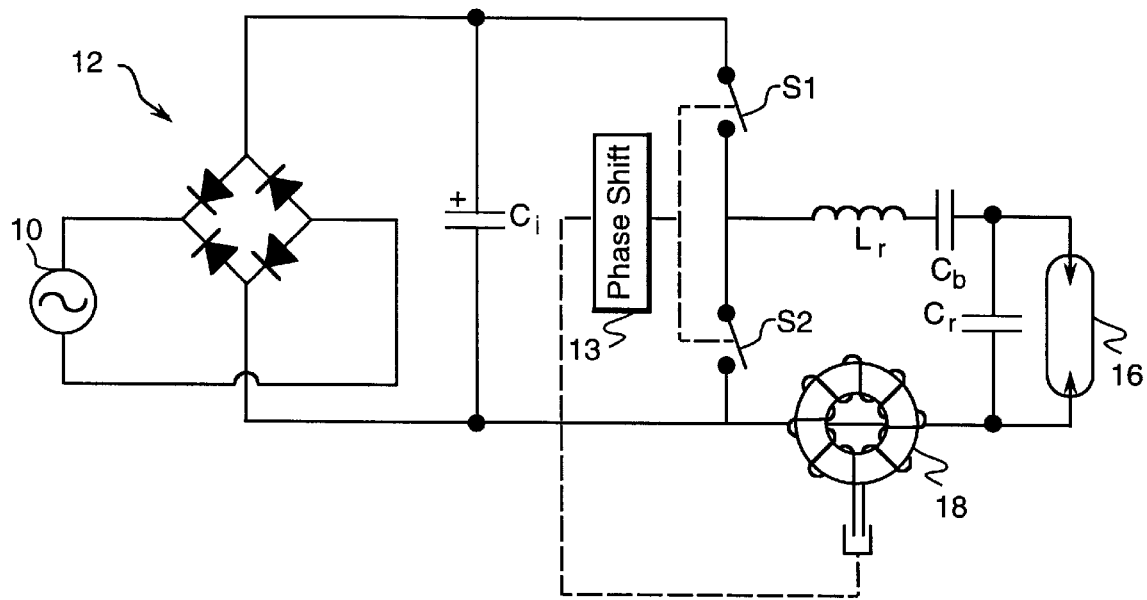
FIG. 2 schematically illustrates a simplified, conventional self-resonant ballast circuit with LC tank current feedback.

FIG. 2 illustrates a typical self-resonant ballast circuit with LC tank current feedback. As illustrated, a current sensing transformer 18 is inserted into the LC tank circuit to feed back a sample of the tank current to the switching devices S1 and S2. Although input power regulation is much improved over the voltage feedback class illustrated in FIG. 1, the two magnetic components increase circuit and layout complexity.

Figure 3:
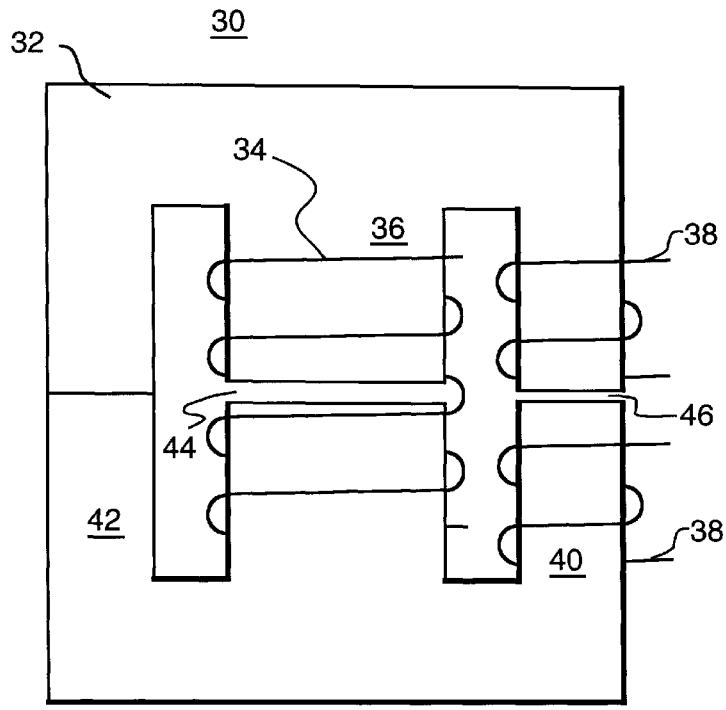
FIG. 3 illustrates a loosely coupled transformer structure useful in a self-resonant ballast circuit according to the present invention.

In accordance with the present invention, a ballast circuit of the current feedback class is modified to employ a single magnetic component comprising a transformer 30 configured as illustrated in FIG. 3 to perform the functions of both the tank inductance and current feedback transformer. Transformer 30 comprises a double-E ("EE") core 32 with inductor windings 34 on a center leg 36 and gate windings 38 on one outer leg 40 (or 42). The outer leg having the secondary windings is referred to herein as the secondary leg; and the outer leg having no windings is referred to herein as the shunt leg.

Preferably, as shown in FIG. 3, the center leg has a gap 44 in order to avoid magnetic core saturation and to adjust inductance. The length I of the gap determines the value of tank inductance. Flux generated in the core divides between the two outer legs of the core. In this way, coupling between the center leg and outer legs is reduced significantly below unity, shifting transformer operation from a voltage transformer toward a current transformer.

Coupling can be adjusted further by providing a gap in one of the outer legs. In particular, to reduce coupling, the secondary leg can be gapped or thinned in cross section. By way of illustration in FIG. 3, secondary leg 40 is shown as having a gap 46.

Initial values of transformer construction parameters can be calculated as follows:

The core and number of turns are chosen exactly as for a simple inductor using the following equations $$B_{peak} = \frac{V_{peak}}{N\omega A_c}$$

and $$G_P = \frac{N^2 \mu_0 A_c}{L}$$

to choose $A_c$, $N$, and $G_P$ to give the desired primary leakage inductance. In these equations, $B_{peak}$ is the peak magnetic field the core can tolerate before saturation, $V_{peak}$ is the peak primary voltage, N is the number of primary turns, $A_c$ is the core cross sectional area, L is the desired inductance, and $\mu_0$ is the permittivity of free space.

The equations above ignore the effects of secondary windings and secondary air gap on the primary winding. However, since this is a loosely coupled transformer, the dominant feature of the primary winding is its leakage inductance. The leakage inductance results from the presence of the unwound shunt leg, which provides a low reluctance path for the majority of the magnetic flux generated by the primary winding. Because this path bypasses the secondary windings, the primary leakage inductance is relatively insensitive to the details of the secondary magnetic circuit. This design method is particularly suitable for transformers with coupling coefficients below, for example, about 0.25. If the secondary design indicates that the shunt leg must be gapped to increase coupling, the primary should be redesigned taking secondary winding effects into account. Further, the equations above ignore the reluctance of the magnetic core material and thus give only initial design values. These values will likely have to be adjusted experimentally if exact component values are required.

What remains is to design the secondary for desired secondary inductance and coupling. There are two parameters that can be adjusted, number of secondary turns ($N_s$) and secondary gap width ($G_s$), to obtain the desired secondary inductance and coupling. Unfortunately, secondary inductance and coupling are both sensitive to $N_s$ and $G_s$; therefore, a set of simultaneous equations must be solved to determine a proper $N_s$ and $G_s$.

An empirical method has also been developed. This involves starting with a secondary winding having a low number of turns (e.g., ten) and adjusting the number of turns to get the required secondary inductance using the formula:

$$N_s = 10 \sqrt{\frac{L_{desired}}{L_{measured}}}.$$

With the new number of secondary turns $N_s$ wound about the core, the value of secondary inductance can be verified.

Next, measure the primary inductance with the secondary open and short circuited. Calculate the coupling coefficient k using the equation:

$$k = \sqrt{\frac{L_{open} - L_{short}}{L_{open}}}.$$

If the coupling is too high, the secondary leg can be gapped to reduce coupling. In the event that k is too low, the shunt leg can be gapped to increase coupling.

One way to assemble the transformer structure of FIG. 3 is to use a snap-together bobbin. This would allow the primary and secondary windings to be manufactured in a conventional manner and then snapped together to make a single bobbin structure into which the EE cores could be inserted. Such a snap-together bobbin could also include a molded-in shim for properly gapping magnetic pieces in volume.

Figure 4:
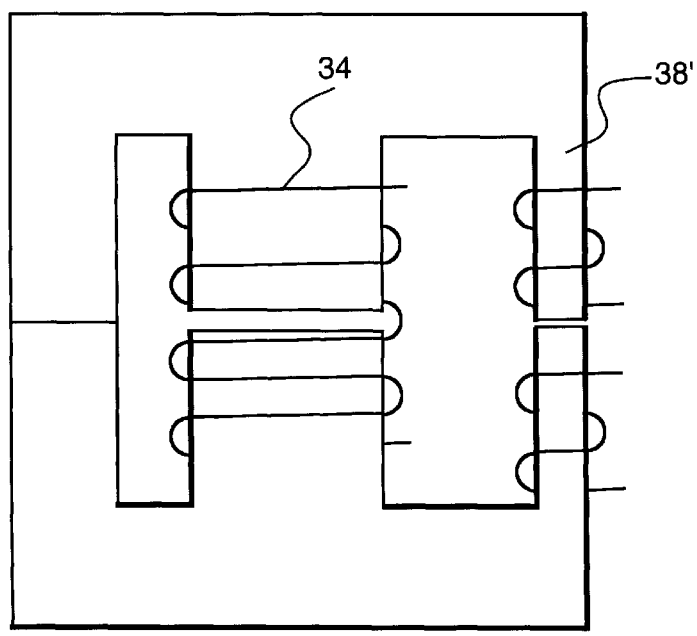
FIG. 4 illustrates magnetic path lengthening and secondary leg thinning for increasing the reluctance of the secondary leg.

Another method for manufacturing a transformer of the type shown in FIG. 3 includes increasing the reluctance of the secondary leg by narrowing all or part of the secondary path, illustrated by narrowed secondary leg 38' in FIG. 4. The same effect can be achieved by lengthening the secondary path by using asymmetrical windows, also as illustrated in FIG. 4. Constructing the secondary path from a different magnetic material of lower permeability than the primary and shunt legs would also serve to increase secondary path reluctance.

It is noteworthy that magnetic structures comprising an ungapped secondary leg and a gapped shunt leg are well-known for use as current limiting transformers, such as described in commonly assigned U.S. Pat. No. 4,613,841 of V. D. Roberts, issued Sep. 23, 1986. Such structures have tightly coupled primary and secondary windings, however, and are thus not suitable for tank current feedback operation.

Figure 5:
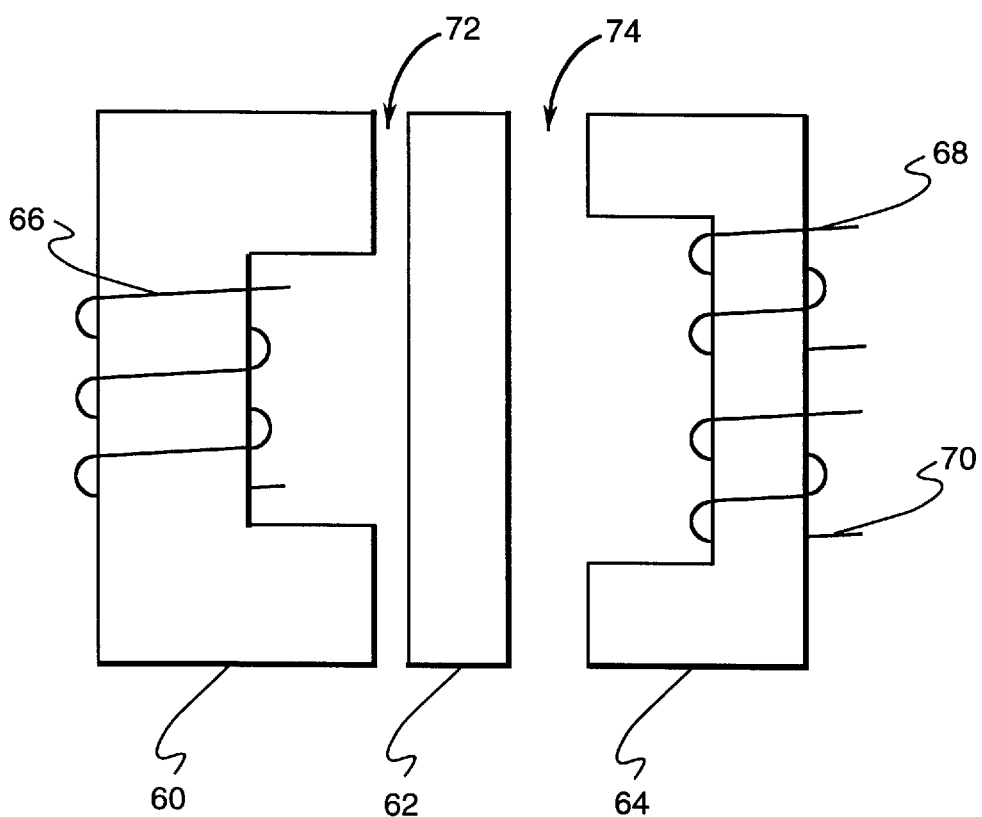
FIG. 5 illustrates an alternative embodiment of a loosely coupled transformer in accordance with the present invention.

FIG. 5 illustrates an alternative embodiment of a loosely coupled transformer suitable for providing both tank inductance and current feedback in a ballast according to the present invention. Specifically, the transformer of FIG. 5 comprises a C-I-C structure; that is, a first C core 60, a middle I core 62, and a second C core 64. The inductor winding 66 is wound on the first C core, and the gate windings 68 and 70 are wound on the second C core. There is a relatively small air gap 72 between the first C core and the I core; and there is a relatively large gap 74 between the I core and the second C core. Further, FIG. 5 shows outer leg 64 having a smaller cross section than outer leg 60 for increasing the reluctance of the secondary path, as described hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A self-resonant lamp ballast, comprising:
   a ballast circuit comprising at least one switching device;
   a resonant tank circuit comprising a tank inductance and a tank capacitance coupled to the output of the ballast circuit;
   current feedback circuitry for providing current feedback from the resonant tank circuit to the ballast circuit, the current feedback circuitry comprising a loosely coupled transformer having a double-E shaped core with a center leg and two outer legs, the center leg having a winding thereon, the winding on the center leg comprising the tank inductance, one of the outer legs having a secondary winding thereon corresponding to the at least one switching device, the other one of the outer legs comprising a shunt leg.

2. The ballast of claim 1 wherein the center leg has a gap formed therein, the tank inductance depending on the length of the gap.

3. The ballast of claim 1, further comprising a gap in at least one of the outer legs for adjusting the coupling between the center leg and the outer legs.

4. The ballast of claim 3 wherein the leg having the secondary winding corresponding to the at least one switching device has a gap therein.

5. The ballast of claim 1 wherein one of the outer legs has a portion which is thinned in cross section with respect to the remaining portions thereof for adjusting the coupling between the center leg and the outer legs.

6. The ballast of claim 1, further comprising asymmetrical windows formed between each respective outer leg and the center leg.

7. The ballast of claim 1 wherein the ballast circuit comprises two switching devices, and one of the outer legs has two secondary windings thereon, each winding corresponding to one of the switching devices.

8. A self-resonant lamp ballast, comprising:

a ballast circuit comprising at least one switching device;

a resonant tank circuitry for providing current feedback from the resonant tank circuit to the ballast circuit, the current feedback circuitry comprising a loosely coupled transformer having a core with a center leg and two outer legs, one of the outer legs having a winding thereon comprising the tank inductance, the other one of the outer legs having a secondary winding thereon corresponding to the at least one switching device, the outer legs having unequal gaps.

9. The ballast of claim 8 wherein the ballast circuit comprises two switching devices, and one of the outer legs has two secondary windings thereon, each winding corresponding to one of the switching devices.

10. The ballast of claim 8 wherein the core comprises a double-E shaped core.

11. The ballast of claim 8 wherein the core comprises a C-I-C shaped core.

12. The ballast of claim 8 wherein the outer legs have unequal cross section.

13. A self-resonant lamp ballast, comprising:

a ballast circuit comprising at least one switching device;

a resonant tank circuit comprising a tank inductance and a tank capacitance coupled to the output of the ballast circuit;

current feedback circuitry for providing current feedback from the resonant tank circuit to the ballast circuit, the current feedback circuitry comprising a loosely coupled transformer having a core with a center leg and two outer legs, one of the outer legs having a secondary winding thereon corresponding to the at least one switching device, the outer legs having unequal cross section.

14. The ballast of claim 13 wherein the ballast circuit comprises two switching devices, and one of the outer legs has two secondary windings thereon, each winding corresponding to one of the switching devices.

15. The ballast of claim 13 wherein the core comprises a double-E shaped core.

16. The ballast of claim 13 wherein the core comprises a C-I-C shaped core.

17. The ballast of claim 13 wherein the outer legs having unequal gaps.

* * * * *